(12) United States Patent
Shindo et al.

(10) Patent No.: US 8,308,933 B2
(45) Date of Patent: *Nov. 13, 2012

(54) METHOD OF RECOVERING VALUABLE METALS FROM IZO SCRAP

(75) Inventors: Yuichiro Shindo, Ibaraki (JP); Kouichi Takemoto, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 269 days.

This patent is subject to a terminal disclaimer.

(21) Appl. No.: 12/863,656

(22) PCT Filed: Jan. 30, 2009

(86) PCT No.: PCT/JP2009/051564
§ 371 (c)(1),
(2), (4) Date: Jul. 20, 2010

(87) PCT Pub. No.: WO2009/101863
PCT Pub. Date: Aug. 20, 2009

(65) Prior Publication Data
US 2010/0282615 A1     Nov. 11, 2010

(30) Foreign Application Priority Data
Feb. 12, 2008   (JP) ................................. 2008-029868

(51) Int. Cl.
C25C 1/22   (2006.01)
C25C 1/16   (2006.01)
(52) U.S. Cl. ....................................... 205/564; 205/602
(58) Field of Classification Search ................... 205/564
See application file for complete search history.

(56) References Cited

U.S. PATENT DOCUMENTS

| | | | |
|---|---|---|---|
| 2,915,444 | A | 12/1959 | Meyer |
| 3,257,299 | A | 6/1966 | MekJean |
| 4,330,377 | A | 5/1982 | Franks, Jr. |
| 4,950,326 | A | 8/1990 | Holly |
| 4,981,564 | A | 1/1991 | Kroll et al. |
| 5,290,412 | A | 3/1994 | Saito et al. |
| 5,417,816 | A | 5/1995 | Nakashima et al. |
| 5,543,031 | A | 8/1996 | Okamoto et al. |
| 5,849,221 | A | 12/1998 | Yukinobu et al. |
| 6,117,209 | A | 9/2000 | Adanuvor |
| 6,896,788 | B2 | 5/2005 | Shindo et al. |
| 7,157,024 | B2 | 1/2007 | Isaji et al. |
| 7,435,325 | B2 | 10/2008 | Shindo et al. |
| 8,003,065 | B2 | 8/2011 | Shindo et al. |
| 8,007,652 | B2 | 8/2011 | Shindo et al. |
| 8,012,335 | B2 | 9/2011 | Shindo et al. |
| 8,012,336 | B2 | 9/2011 | Shindo et al. |
| 8,012,337 | B2 | 9/2011 | Shindo et al. |
| 2009/0004498 | A1 | 1/2009 | Shindo et al. |
| 2010/0072075 | A1 | 3/2010 | Shindo et al. |
| 2010/0084279 | A1 | 4/2010 | Shindo et al. |
| 2010/0084281 | A1 | 4/2010 | Shindo et al. |
| 2010/0101963 | A1 | 4/2010 | Shindo et al. |
| 2010/0101964 | A1 | 4/2010 | Shindo et al. |
| 2010/0193372 | A1 | 8/2010 | Shindo et al. |
| 2010/0288645 | A1 | 11/2010 | Shindo et al. |
| 2010/0288646 | A1 | 11/2010 | Shindo et al. |
| 2010/0294082 | A1 | 11/2010 | Shindo et al. |
| 2010/0316544 | A1 | 12/2010 | Shindo et al. |

FOREIGN PATENT DOCUMENTS

| | | |
|---|---|---|
| JP | 01-219186 A | 9/1989 |
| JP | 05-156381 A | 6/1993 |
| JP | 07-145432 A | 6/1995 |
| JP | 11-343590 A | 12/1999 |
| JP | 2003-247089 A | 9/2003 |
| JP | 2005-314786 A | 11/2005 |
| JP | 2007-131953 A | 5/2007 |
| WO | 2008/053616 A1 | 5/2008 |
| WO | 2008/053617 A1 | 5/2008 |
| WO | 2008/053618 A1 | 5/2008 |
| WO | 2008/053619 A1 | 5/2008 |
| WO | 2008/053620 A1 | 5/2008 |
| WO | 2008/099773 A1 | 8/2008 |
| WO | 2008/099774 A1 | 8/2008 |
| WO | 2008/117649 A1 | 10/2008 |

OTHER PUBLICATIONS

One page English language Abstract of JP 62-290900 A, Dec. 17, 1987.
One page English language Abstract of JP 08-041560 A, Feb. 13, 1996.
One page English language Abstract of JP 03-082720 A, Apr. 8, 1991.
One page English language Abstract of JP 2000-169991 A, Jun. 20, 2000.
One page English language Abstract of JP 2002-069684 A, Mar. 8, 2002.
One page English language Abstract of JP 2002-069544 A, Mar. 8, 2002.

(Continued)

Primary Examiner — Harry D Wilkins, III
(74) Attorney, Agent, or Firm — Howson & Howson LLP

(57) ABSTRACT

Provided are a method of recovering valuable metals from IZO scrap, wherein valuable metals are recovered as hydroxides of indium and zinc by using an insoluble electrode as an anode or a cathode and an IZO scrap as the other cathode or anode as the opposite electrode, and performing electrolysis while periodically reversing polarity; and a method of recovering valuable metals from IZO scrap, wherein the hydroxides of indium and zinc obtained by the electrolysis are roasted and valuable metals are recovered as oxides of indium and zinc. Specifically, provided is a method which enables the efficient recovery of indium and zinc from IZO scrap such as a spent indium-zinc oxide (IZO) sputtering target and IZO mill ends arising during the manufacture of such a sputtering target.

3 Claims, No Drawings

OTHER PUBLICATIONS

One page English language Abstract of JP 2002-241865 A, Aug. 28, 2002.

One page English language Abstract of JP 63-274725 A, Nov. 11, 1988.

METHOD OF RECOVERING VALUABLE METALS FROM IZO SCRAP

BACKGROUND OF THE INVENTION

The present invention relates to a method of recovering valuable metals from IZO scrap such as a spent indium-zinc oxide (IZO) sputtering target or IZO mill ends arising during the manufacture of such a target (hereinafter collectively referred to as the "IZO scrap" in this specification). Incidentally, "recovery of valuable metals" as used herein shall include the recovery of compounds of oxides, hydroxides and the like, which have valuable metal as their component.

In recent years, an indium-zinc oxide ($In_2O_3$—ZnO: generally known as IZO) sputtering target is being widely used for a transparent conductive thin film of an LCD device, a gas sensor and the like. In many cases, however, a thin film is formed on a substrate or the like by employing the sputtering method as the thin film forming means.

Although the sputtering method as the thin film forming means is a superior method; for example, if a sputtering target is used to form a transparent conductive thin film, the target will not be consumed uniformly. A portion of the target with severe consumption is generally referred to as an eroded portion, and the sputtering operation is continued until immediately before a backing plate supporting the target becomes exposed due to the further consumption of the eroded portion. This target is subsequently replaced with a new target.

Accordingly, a spent sputtering target will have numerous non-eroded portions; that is, unused portions of the target, and all of these portions become scrap. Moreover, even during the manufacture of an IZO sputtering target, scraps (mill ends) will arise from grinding dust and cutting wastage. Generally speaking, although the scrap contains zinc oxide (ZnO) at approximately 10.7 wt %, the scrap is mostly indium oxide ($In_2O_3$).

Because high-purity materials are used as the IZO sputtering target material and because indium is particularly expensive; in general, indium and zinc are simultaneously recovered from the foregoing scrap materials. As this kind of indium recovery method, conventionally, a method that combines wet refining such as the acid solution process, ion exchange method, and solvent extraction method has been used.

For instance, there is a method of subjecting an IZO scrap to cleansing and pulverizing, dissolving the obtained materials with hydrochloric acid, precipitating and eliminating impurities, such as zinc, lead and copper, as sulfide by passing hydrogen sulfide through the solution, thereafter adding ammonia to neutralize the solution, and recovering the resulting indium hydroxide.

Nevertheless, the indium hydroxide obtained by the foregoing method has inferior filtration property, requires long operational process, and contains large amounts of impurities such as Si and Al. In addition, with the created indium hydroxide, since the grain size and grain size distribution will vary depending on the neutralization condition, maturization condition and other conditions, there is a problem in that the characteristics of the IZO target cannot be stably maintained upon subsequently manufacturing such IZO target.

Conventional technology and its advantages and disadvantages are described below.

As one example of such conventional technology, there is an etching method of a transparent conductive film including the steps of reducing an ITO film deposited on a substrate by an electrochemical reaction in the electrolyte, and dissolving the reduced transparent conductive film in the electrolyte (refer to Patent Document 1). However, the object of this method is to obtain a mask pattern with high precision, and relates to technology that is different from the recovery method.

For pretreatment for recovering valuable metals from ITO, there is also technology of separating, in the electrolyte, the impurities contained in an In-based brazing filler material used in the bonding with the backing plate (refer to Patent Document 2). Nevertheless, this method does not relate to direct technology of recovering valuable metals from ITO.

Moreover, upon recovering indium from an intermediate obtained as a by-product of the zinc refining process or from an ITO scrap, disclosed is technology of separating tin as halogenated stannate, performing reduction treatment with hydrochloric acid or nitric acid solution, subsequently adjusting the pH of this aqueous solution to be between 2 and 5, reducing metallic ions of iron, zinc, copper, thallium and the like in order to make the metallic ions into a substance that will not precipitate easily, and isolating the indium component in the aqueous solution (refer to Patent Document 3). With this technology, however, there are problems in that the refining process is complicated and a superior refining effect cannot be expected.

Further, as a method of recovering high-purity indium, disclosed is technology of dissolving ITO in hydrochloric acid, adding alkali thereto to make the pH within a range of 0.5 to 4, eliminating tin as hydroxide, subsequently blowing hydrogen sulfide gas in order to eliminate hazardous materials such as copper and lead as sulfide, and electrowinning indium metal by performing electrolysis using the obtained solution (refer to Patent Document 4). There is a problem with this technology in that the refining process is complicated.

In addition, proposed is a method of dissolving an ITO indium-containing scrap in hydrochloric acid to obtain an indium chloride solution, adding a sodium hydroxide solution to this solution to eliminate tin as tin hydroxide, additionally adding a sodium hydroxide solution thereto after the elimination to obtain indium hydroxide, filtering the obtained indium hydroxide to obtain indium sulfate from the filtered indium hydroxide, and obtaining indium by electrowinning with the indium sulfate (refer to Patent Document 5). Although this is an effective method with a significant refining effect, there is a drawback in that the process is complicated.

Also proposed is a method of recovering indium including the steps of dissolving an ITO indium-containing scrap in hydrochloric acid to obtain an indium chloride solution, adding a sodium hydroxide solution to the indium chloride solution to eliminate tin contained in the scrap as tin hydroxide, substituting indium with zinc from the solution after eliminating the tin hydroxide, and thereafter recovering indium (refer to Patent Document 6). Although this is also an effective method with a significant refining effect, there is a drawback in that the process is complicated.

Additionally disclosed is a method of recovering metallic indium including the steps of extracting suboxide-containing cast scrap floating on molten metallic indium, introducing this into an atmosphere furnace, introducing argon gas into the furnace after vacuating the furnace once, heating the furnace to a prescribed temperature and reducing the suboxide-containing cast scrap (refer to Patent Document 7).

Although this is in itself an effective method, there is a drawback in that this is not a fundamental recovery method from ITO scrap.

In light of the above, a method that is efficient and with a versatile recovery process is being sought.

[Patent Document 1] Japanese Patent Laid-Open Publication No. S62-290900
[Patent Document 2] Japanese Patent Laid-Open Publication No. H8-41560
[Patent Document 3] Japanese Patent Laid-Open Publication No. H3-82720
[Patent Document 4] Japanese Patent Laid-Open Publication No. 2000-169991
[Patent Document 5] Japanese Patent Laid-Open Publication No. 2002-69684
[Patent Document 6] Japanese Patent Laid-Open Publication No. 2002-69544
[Patent Document 7] Japanese Patent Laid-Open Publication No. 2002-241865

SUMMARY OF THE INVENTION

In order to overcome the foregoing problems, the present invention provides a method of efficiently recovering indium and zinc from IZO scrap such as a spent indium-zinc oxide (IZO) sputtering target or IZO mill ends arising during the manufacture of such a target.

The present invention provides a method of recovering valuable metals from IZO scrap by performing electrolysis to such IZO scrap in a pH-adjusted electrolyte to obtain indium and zinc as hydroxides of indium and zinc.

The method of recovering valuable metals from IZO scrap according to the present invention is unique in that an insoluble electrode is used as either an anode or a cathode, and an IZO scrap is used as the other cathode or anode as the opposite electrode. In the foregoing case, electrolysis is performed while periodically reversing the polarity of both the anode and cathode; that is, electrolysis is performed while periodically alternating the polarity (interconversion of anode polarity ↔ cathode polarity).

Consequently, it is possible to efficiently recover valuable metals as the hydroxides of indium and zinc. This kind of technology did not exist conventionally. Nor is there any document that suggests this kind of method. Thus, the method of recovering valuable metals from IZO scrap according to the present invention is a basic invention.

Since an IZO scrap is an oxide-system ceramic, it would not normally be possible to envisage recovering valuable metals by the electrolytic method. Nevertheless, IZO itself possesses conductive property even though it is an oxide-system ceramic. The present invention focused attention on this point and attempted to recover valuable metals (for instance, indium or zinc and the compound thereof) by electrolysis, and succeeded.

It is well known that IZO itself possesses conductive property. This is considered to be due to the oxygen defect in the IZO oxide as the sintered compact of zinc oxide (ZnO) and indium oxide ($In_2O_3$). The present invention utilizes the conductive property of the IZO itself. Nevertheless, it should be understood that the knowledge and judgment that the conductive property inherent in IZO itself enables a recovery of valuable metals by electrolysis could only be realized through the implementation of numerous experiments.

When performing a conventional method of recycling IZO scrap; a recycled IZO is manufactured by pulverizing the IZO scrap, dissolving it in strong acid, and then going through a process in that a plurality of process steps, such as reduction, substitution, sulfurization, precipitation, neutralization, filtration, solvent extraction, ion exchange and casting, are arbitrarily combined.

The problem in the foregoing process steps are that impurities are incorporated during the pulverization process of IZO scrap, and the overall process becomes more complicated since it is necessary to eliminate the impurities incorporated during the pulverization process at the subsequent process steps.

Thus, it should be easy to understand that it has an extremely significant benefit that valuable metals can be recovered directly from IZO scrap by electrolysis.

With the method of recovering valuable metals from IZO scrap according to the present invention, it is desirable to further reverse the polarity of the anode and cathode when the voltage rises beyond a certain level during the electrolysis. As described later, the polarity conversion of the anode and the cathode is a means for improving the recovery efficiency, and the voltage becomes an index thereof. Accordingly, it is possible to detect the point of time when the voltage rises, and set the timing to reverse the polarity accordingly.

Generally speaking, if the equipment is fixed, it is possible to constantly grasp the optimal condition of the reverse timing. Thus, it is also possible to reverse the polarity in certain intervals according to the foregoing optimal condition. Accordingly, it should be understood that the timing to reverse the anode and cathode polarity can be arbitrarily controlled and is not constrained by the foregoing conditions.

Moreover, during the foregoing electrolysis, it is preferable to reverse the polarity of the anode and the cathode in 1-minute to 10-minute cycles. However, it is a condition that the timing to reverse the polarity can also be arbitrarily changed according to the capacity of the electrolytic bath, amount of IZO scrap, current density, voltage, current, and type of electrolyte. It should be easy to understand that the foregoing condition merely shows a preferable condition, and the present invention is not constrained by such condition described above.

Upon recovering valuable metals from IZO scrap according to the present invention, after performing the foregoing electrolysis, valuable metals can be recovered as the hydroxides of indium and zinc. It is desirable to adjust the initial pH of the electrolyte to be between 8 and 12. This is a preferable condition for efficiently recovering the hydroxides of indium and zinc.

This is because, in the foregoing case, if the pH is less than 8 or exceeds 12, the indium and zinc will dissolve and be electrodeposited as ions and thereby deteriorate the efficiency.

The selection of pH is arbitrary as described above. The gist of the present invention is to recover indium and zinc as hydroxides by performing electrolysis while periodically reversing polarity. Thus, so as long as this method does not exist as publicly known technology, there is no reason that the present invention should be limited to the foregoing pH. In addition, even if the pH is subsequently devised or improved, it is evident that such devisal or improvement is within the foregoing concept of the present invention and should be covered by this invention.

As the electrolyte, it is desirable to select a fluid that does not generate hazardous gas and is a material of which component will not be incorporated as an impurity when recovering the hydroxides of indium and zinc. Thus, a solution of sodium sulfate, sodium chloride, sodium nitrate, ammonium sulfate, ammonium chloride, ammonium nitrate, potassium chloride, potassium nitrate, potassium sulfate and the like may be arbitrarily selected and used.

Nevertheless, so as long as the solution can be used to perform electrolysis of the IZO scrap while giving consideration to the production efficiency, it should be understood that solutions other than those listed above may also be used as the electrolyte. The selection of the electrolyte is merely to arbitrarily select a solution that accommodates the condition of being able to electrolyze the IZO scrap, and it is obvious that such selection is not the essence of the present invention.

Although the present invention achieves its object by recovering the hydroxides of indium and zinc that were obtained by way of electrolysis upon recovering valuable metals from IZO scrap, it is also possible to recover indium and zinc as oxides by roasting the hydroxides of indium and zinc.

As described above, if it is possible to once obtain the hydroxides of indium and zinc from the IZO scrap, these can be roasted in order to obtain a mixture of indium oxide and zinc oxide, and the obtained material can be used as is as the IZO raw material. Moreover, as needed, indium oxide or zinc oxide may be added to change the ingredient amount or other elements may be added, and the IZO target can be easily recycled by sintering the resultant. The present invention covers all of the foregoing aspects.

In addition, the hydroxides of indium and zinc that were obtained by way of electrolysis as described above may be subject to acid leaching to obtain a solution of indium and zinc, this solution can be pH-adjusted to eliminate zinc as zinc hydroxide, and indium can thereby be recovered by way of electrowinning.

As described above, the method of recovering valuable metals from IZO scrap according to the present invention enables to recover high-purity indium and zinc as hydroxides, which retain the purity of IZO scrap itself if such IZO scrap subjected to electrolysis is a scrap formed from high-purity material.

It goes without saying that this is a significant advantage of the present invention. The present invention yields superior effects of no longer requiring such complicated processes and process of eliminating impurities incorporated during manufacture as were required in the past, and being able to increase the production efficiency and recover high-purity valuable metals.

The electrolytic condition such as the current density is not uniformly decided since the subject is scrap such as mill ends, and electrolysis is performed by arbitrarily selecting the current density according to the amount of mill ends and the nature of material. The liquid temperature of the electrolyte solution is generally set to a range of 0 to 100° C., but room temperature (15 to 30° C.) will suffice.

Since electrolysis is simply performed by using IZO scrap of an indium-zinc oxide (IZO) sputtering target or IZO mill ends arising during the manufacture of such a target and using an insoluble electrode and the cathode formed from the scrap, the present invention is a superior method which enables simple and efficient recovery of valuable metals as hydroxides of indium and zinc, and as a mixture of indium oxide and zinc oxide.

Moreover, the method of recovering valuable metals from IZO scrap according to the present invention enables to recover high-purity indium and zinc as hydroxides, which retain the purity of IZO scrap itself if such IZO scrap subjected to electrolysis is a scrap formed from high-purity material.

This is a significant advantage of the present invention. The present invention yields superior effects of no longer requiring such complicated processes and process of eliminating impurities incorporated during manufacture as were required in the past, and being able to increase the production efficiency and recover high-purity valuable metals.

DETAILED DESCRIPTION OF THE INVENTION

The present invention is able to easily recover valuable metals as hydroxides of indium and zinc from indium-containing scrap of the IZO target by electrolysis. Moreover, by roasting the obtained hydroxides of indium and zinc, it is possible to efficiently recover valuable metals as a mixture of indium oxide and zinc oxide.

The roasting temperature is set to 100 to 1000° C., preferably 100 to 500° C. Moisture will remain if the roasting temperature is less than 100° C., and sintering will occur if the roasting temperature is higher than 1000° C. Thus, it is desirable to set the roasting temperature within the foregoing range. However, the selection of the roasting temperature is arbitrary. As described above, the gist of the present invention is to roast the hydroxides of indium and zinc obtained by performing electrolysis while periodically reversing polarity. Thus, so as long as this method does not exist as publicly known technology, there is no reason that the present invention should be limited to the foregoing roasting temperature. In addition, even if the roasting temperature is subsequently devised or improved, it is evident that such devisal or improvement is within the foregoing concept of the present invention and should be covered by this invention.

As the electrolyte, a solution of sodium sulfate, sodium chloride, sodium nitrate, ammonium sulfate, ammonium chloride, ammonium nitrate, potassium chloride, potassium nitrate, potassium sulfate and the like may be arbitrarily selected and used.

Since chlorine gas will be generated with a passivation of the anode if the anion is of chlorine series, and since nitric oxide gas will be generated and there will be a nitrogen load of the discharged water with a passivation of the anode if the anion is of nitric acid series; attention is required to the processing.

Since sulfuric acid series hardly entail the foregoing problems, it could be said that a solution of sulfuric acid series would be a suitable material. Nevertheless, there is no reason that other electrolytes cannot be used so as long as the foregoing problems can be overcome.

In addition, it is also possible to use a publicly-known additive agent in order to improve the current efficiency. As described above, it should be easy to understand that recycled IZO can be manufactured easily if indium oxide and zinc oxide can be simultaneously recovered.

A special electrolytic apparatus is not required. For instance, it would suffice to perform electrolysis using an insoluble electrode as either an anode or a cathode and using an IZO scrap as the other cathode or anode as the opposite electrode. Whether to use an insoluble electrode or an IZO scrap as the initial anode or cathode is not particularly a problem. The reason for this is because the polarity is periodically reversed. It should be easy to understand that the present invention accommodate both cases.

It is thereby possible to avoid the increase or inclusion of impurities more than initially contained in the IZO scrap. A publicly known insoluble electrode may be used. Although carbon or the like is a preferred material, it is not necessary to limit the insoluble electrode to carbon or the like. Any material that is referred to as an insoluble electrode may be used. It should be easy to understand that the selection of the insoluble electrode is not the gist of the present invention.

It is desirable to adjust the electrolytic condition as needed according to the type of raw material. The only factor to be adjusted in this case is the production efficiency. Generally speaking, better productivity can be attained through electrolysis with a large current and high voltage. Nevertheless, there is no need to limit the conditions to the foregoing conditions, and such conditions may be arbitrarily selected.

Further, although there is no particular limit on the electrolysis temperature, it is desirable to adjust the temperature to 0 to 100° C. to perform electrolysis. Electrolysis can be sufficiently performed at room temperature. Scraps such as mill ends may be placed in a cathode box (basket) for the electrolysis. If a scrap itself is of a certain size (enough size that can be used as an electrode), it can be used as an electrode plate as is.

When electrical current is applied to the cathode formed from an insoluble electrode or an IZO scrap and electrolysis is started, oxygen gas is generated at the insoluble anode. However, this generation of oxygen gas is not a particular problem. At the IZO scrap cathode, hydrogen gas is generated simultaneously with the start of energization, and the IZO scrap is subject to hydrogen reduction and becomes indium-zinc metal ($IZO + H_2 \rightarrow In$—$Zn$ metal). The generation of hydrogen is caused by the electrolysis of water ($H_2O \rightarrow \frac{1}{2}H_2 + OH^-$).

This indium-zinc metal is accumulated on the cathode surface of the IZO scrap, and a part of it is deposited as a mixture of indium hydroxide and zinc hydroxide.

However, if the energization time becomes long, In—Zn metal having a certain thickness is accumulated on the cathode surface of the IZO scrap, only sponge-like In—Zn oxide will be formed below the In—Zn metal surface layer, and reduction will no longer advance.

It is believed the main causes of interference with the progress of electrolysis are that the In—Zn metal surface layer is inhibiting the infiltration of hydrogen, and that current only flows to the In—Zn metal surface layer and the flow of current to the inside of the IZO scrap is inhibited. In this kind of state, the intended electrolysis will be inhibited at the IZO scrap cathode. Thus, the polarity of the insoluble electrode anode and the IZO scrap cathode is reversed. This is an extremely important process.

Consequently, the In—Zn metal that was accumulated on the surface of the new anode (former cathode) will dissolve. Since the electrolyte is retained in a neutral area, it will precipitate as hydroxide. The precipitate obtained thereby can be recovered as the hydroxides of indium and zinc. The primary reaction formula can be represented as ($In$—$Zn \rightarrow In^{3+} + Zn^{2+} \rightarrow In(OH)_3 + Zn(OH)_2$). Slight generation of oxygen can be acknowledged with the new anode.

Meanwhile, with the new cathode (former anode), since an insoluble electrode is being used, there is no change in essentials and only hydrogen gas is generated.

Precipitation of the hydroxides of indium and zinc is promoted with the foregoing process. Nevertheless, if this state continues, only the surface layer of the new cathode becomes In—Zn metal once again, but the inside will stop energizing and electrolysis will no longer progress. The polarity is once again reversed before reaching this state. As a result of repeating the foregoing process, it is possible to steadily promote the precipitation of the hydroxides of indium and zinc.

As a result of adopting this process of periodically reversing the electrodes, the generation of gas such as hydrogen and oxygen at the electrode will decrease considerably in comparison to a case that each of the electrodes is fixed at either the anode or cathode. This demonstrates that the generated gas is being effectively consumed for oxidization and reduction.

The polarity conversion of the anode and the cathode is a means for improving the recovery efficiency, and the voltage becomes an index thereof. Accordingly, it is possible to detect the point of time when the voltage rises, and thereby set the timing to reverse the polarity. If the equipment is fixed, it is possible to constantly grasp the optimal condition of the reverse timing. Thus, it is also possible to reverse the polarity in fixed intervals according to the foregoing optimal condition.

Moreover, according to the experiments, it is preferable to reverse the polarity of the anode and the cathode in 1-minute to 10-minute cycles. However, the timing to reverse the polarity is also a condition that can be arbitrarily changed according to the capacity of the electrolytic bath, amount of IZO scrap, current density, voltage, current, and type of electrolyte.

EXAMPLES

The present invention is now explained in detail with reference to the Examples. These Examples are merely illustrative, and the present invention shall in no way be limited thereby. In other words, various modifications and other embodiments based on the technical spirit claimed in the claims shall be included in the present invention as a matter of course.

Example 1

90 g of IZO (indium oxide-zinc oxide) tabular mill ends (scrap) having 20 mm wide×100 mm long×6 t was used as the raw material. In this raw material, the components were 10.7 wt % of zinc oxide (ZnO) and the remaining indium oxide ($In_2O_3$); that is, the metal ratio was In: 73.8 wt %, Zn: 8.6 wt %, and the remaining oxygen (O).

This raw material was used as the cathode, and carbon as an insoluble electrode was used as the anode. Electrolysis was performed by using 1 L of electrolyte containing 70 g/L of sodium sulfate under the following conditions; namely, pH of 9.0 and electrolysis temperature of 30° C.

The voltage was set at 10V (constant voltage), the current was set from 2.95 A (at the onset) to 1.2 A (at the end), and energization (polarity conversion every 5 minutes×12 cycles) was performed for a total of 60 minutes (1 hour). Consequently, a mixture of indium hydroxide and zinc hydroxide precipitated in the electrolytic bath.

Consequently, 10 g of $In(OH)_3$ (In grade: 69.23 wt %) and 2 g of $Zn(OH)_2$ (Zn grade: 7.73 wt %) were obtained. The purity of this mixture of indium hydroxide and zinc hydroxide was equivalent to the purity of the scrap.

Example 2

The mixture of indium hydroxide and zinc hydroxide obtained as described above was additionally roasted at 150° C., and a mixture of In oxide ($In_2O_3$) and Zn oxide (ZnO) was thereby obtained. This mixture was approximately 12 g. The resultant ratio obtained by this method is normally $In_2O_3$: 90 wt % and ZnO: 10 wt %, and it could be used as the raw material of recycled IZO.

Example 3

The mixture of indium hydroxide and zinc hydroxide obtained by electrolysis was additionally subject to acid leaching with sulfuric acid to obtain a solution of indium and zinc, and indium was further recovered by electrowinning under the following conditions; namely, electrolysis temperature of 30° C. and current density of 2 A/dm².

It was possible to recover the valuable metal of In from the IZO scrap. The In yield rate was 98%.

Example 4

The IZO mill ends of Example 1 were used as the cathode and Pt was used as the anode, and electrolysis was performed using a solution of 100 g/L of sodium nitrate at pH of 10. Consequently, indium hydroxide was obtained. The recovered amount and the purity were the same as Example 1.

Example 5

The current was fixed at 2A, and the setting was made so that the polarity is reversed when the voltage becomes 10V or higher. The other conditions were the same as the conditions of Example 1, and the integrated current was also the same.

Consequently, the recovered amount and the purity were roughly the same as Example 1.

Example 6

The cycle was changed to 1-minute intervals, and electrolysis was performed with the other conditions being the same as the conditions of Example 1. Consequently, the recovered amount and the purity were equivalent to Example 1.

Example 7

The cycle was changed to 10-minute intervals, and electrolysis was performed with the other conditions being the same as the conditions of Example 1. Consequently, approximately 9 g of a mixture of In oxide ($In_2O_3$) and Zn oxide (ZnO) was obtained, and the purity was equivalent to Example 1.

Example 8

10 kg of IZO mill ends were placed in a cathode box, Pt was used as the anode, and electrolysis was performed in a solution of 100 g/L of sodium chloride with pH 10.5. The polarity conversion was performed in 5-minute intervals. In addition, the integrated current of electrolysis was 10,000 AHr. Consequently, approximately 6 kg of a mixture of In oxide ($In_2O_3$) and Zn oxide (ZnO) was obtained. Moreover, the purity of the obtained mixture was roughly the same as Example 1.

Comparative Example 1

The same IZO scrap as Example 1 was used as the cathode, and insoluble carbon was used as the anode. The electrolysis conditions were the same as Example 1. Consequently, indium-zinc metal was obtained at the cathode, but this was only on the cathode surface and the overall cathode could not be metalized. Valuable metals could not be effectively recovered.

Although, in each of the foregoing Examples, IZO (indium oxide-zinc oxide) mill ends or scraps of which components were approximately 10 wt % of zinc oxide (ZnO) and the remaining indium oxide ($In_2O_3$) were used, it goes without saying that the electrolytic conditions such as current density and pH can be arbitrarily changed according to the component amount of $In_2O_3$ and ZnO and the raw material is not to be considered particularly limited to the foregoing component amount. In particular, with IZO, the content of zinc oxide (ZnO) varies from 5 wt % to 30 wt %, and the present invention can also be sufficiently applied in the foregoing cases.

In addition, although there are cases where small amounts of accessory components are added to the IZO, so as long as IZO is the basic constituent, it goes without saying that the present invention can also be applied to this case.

With the present invention, by using an IZO scrap as an anode or a cathode and changing the polarity, it is possible to efficiently recover valuable metals from IZO scrap as a mixture of indium hydroxide and zinc hydroxide.

Since IZO scrap of an indium-zinc oxide (IZO) sputtering target or IZO mill ends arising during the manufacture of such a target is used as cathode and electrolysis is simply performed by using such IZO scrap as the anode or cathode, the present invention enables simple and efficient recovery of valuable metals as a mixture of indium hydroxide and zinc hydroxide, and a mixture of indium oxide and zinc oxide.

Moreover, with the method of recovering valuable metals from IZO scrap according to the present invention, so as long as the IZO scrap itself to be used in the electrolysis is a scrap formed from high-purity material, it is possible that the obtained material retains the purity of the scrap without change, and recover a mixture of high-purity indium hydroxide and zinc hydroxide or a mixture of high-purity indium oxide and zinc oxide.

This is a significant advantage of the present invention. The present invention yields superior effects of no longer requiring such complicated processes and process of eliminating impurities incorporated during manufacture as were required in the past, and being able to increase the production efficiency and recover high-purity valuable metals. Thus, the present invention is extremely useful as a method of recovering valuable metals from IZO scrap.

The invention claimed is:

1. A method of recovering valuable metals from IZO scrap, wherein valuable metals are recovered as hydroxides of indium and zinc by using an insoluble electrode as an anode or a cathode and an IZO scrap as the other cathode or anode as the opposite electrode, and performing electrolysis while periodically reversing polarity.

2. The method of recovering valuable metals from IZO scrap according to claim 1, wherein the hydroxides of indium and zinc obtained by the electrolysis are roasted and valuable metals are recovered as oxides of indium and zinc.

3. The method of recovering valuable metals from IZO scrap according to claim 1, wherein the hydroxides of indium and zinc obtained by the electrolysis are subject to acid leaching to obtain a solution of indium and zinc, the solution is pH-adjusted to eliminate zinc as zinc hydroxide, and indium is further recovered by electrowinning.

* * * * *